Patented Nov. 18, 1947

2,430,949

UNITED STATES PATENT OFFICE 2,430,949

POLYVINYL ALCOHOL-STABILIZED ETHANOL FORMAMIDE COMPOSITION

Charles Arthur Porter, Belleville, and Reuben Fershko, Newark, N. J., assignors to Resistoflex Corporation, Belleville, N. J., a corporation of New York No Drawing. Application January 3, 1946, Serial No. 638,916

6 Claims. (Cl. 260—36)

This invention relates to the stabilization of ethanol formamide and to polyvinyl alcohol compositions containing the stabilized product.

The stabilized ethanol formamide product is the subject matter of our application Ser. No. 722,754, filed January 17, 1947, as a division hereof. The claims herein are directed to polyvinyl alcohol compositions containing the stabilized product.

Ethanol formamide ($HCO \cdot NH \cdot C_2H_4 \cdot OH$), as commercially produced, is initially a colorless neutral liquid. It is useful as a plasticizer or softening agent, especially in polyvinyl alcohol compositions.

During storage at ordinary room temperatures it has been found that ethanol formamide shows indications of decomposition in becoming progressively more discolored and alkaline. Heat accelerates this decomposition. When held at 130° C. for 48 hours there is pronounced color change, the substance darkening, precipitate is formed and the material becomes alkaline.

Polyvinyl alcohol compositions containing ethanol formamide as plasticizer are frequently subjected to temperatures as high as 130° C. as, for example, in flexible oil lines used on gasoline and Diesel engines. Under such circumstances it is disadvantageous to have a plasticizer undergoing decomposition as it results in loss of flexibility.

The objects of this invention are to stabilize ethanol formamide and to provide improved polyvinyl alcohol compositions plasticized with the stabilized product.

It has been discovered that the decomposition of ethanol formamide can be prevented or greatly retarded by adding thereto formic acid or acetic acid or their esters with glycerol and glycols.

Formic acid has been found to have the most pronounced stabilizing effect and to be effective for the longest time. Acetic acid is an effective stabilizer but its efficacy does not endure for as long at elevated temperatures. The effectiveness of the glycerol and glycol esters of these acids is believed to be due to the liberation of free acid when heated or subjected to hydrolyzing conditions. Where these esters are used as plasticizers for polyvinyl alcohol they have the further advantage that in addition to providing the stabilizing acid they also yield high-boiling plasticizing substances.

Examples of suitable esters are glycol diformate, glycol diacetate, monoacetin, diacetin and triacetin. When glycol diformate, for example, is hydrolyzed to produce formic acid, which acts to stabilize the ethanol formamide, it also yields glycol which is in itself a plasticizer for polyvinyl alcohol.

Comparisons made between treated and untreated ethanol formamide, showed the following advantages. Untreated ethanol formamide heated at 130° C. for 48 hours suffered pronounced decomposition as indicated by color change, the production of precipitate and increased alkalinity. Ethanol formamide containing 5% of 85% formic acid showed no decomposition after 200 hours under the same conditions. When 5% of acetic acid (glacial), glycol diacetate, diacetin or triacetin was incorporated in ethanol formamide, no decomposition was evident after 100 hours of heating at 130° C. as compared with pronounced decomposition in 48 hours of the untreated material. Only after 100 hours was slight decomposition noticed. Glycol diformate had a comparable stabilizing effect.

The amount of stabilizer to be used will depend on the impurities which may be present in the ethanol formamide. The impurities are known to be alkaline in nature and there must be sufficient acid to effect neutralization. We believe that the impurities, which result from and in turn may promote the decomposition, are probably amines and that the acid reacts with them to form salts which on subsequent heating would yield amides having no tendency to cause any decomposition of the ethanol formamide. We do not wish, however, to be limited by this theory.

It has been found that from 3% to 5% of the stabilizing agent is generally sufficient and no undesirable effects have been observed in using as much as 20%, where the stabilized product was used as a plasticizer for polyvinyl alcohol. The only apparent requirement with respect to quantity is to use enough to secure the stabilizing effect.

Formic acid (85%) was mixed with ethanol formamide in the weight ratio of 5 to 95 and heated in an open flask at 130° C. for 24 hours. Initially there was a strong odor of formic acid which gradually disappeared, the final stabilized product being completely odorless. Since the temperature was considerably above the boiling point of formic acid, it is evident that no free acid could be present at the end of the period, yet the ethanol formamide remained stable and showed no other change in its properties. It has been found further that such treatment, in addition to rendering ethanol formamide stable, will also remove slight discoloration which may exist before the stabilizer is added.

The stabilized ethanol formamide just described was incorporated as plasticizer in the following polyvinyl alcohol composition, suitable for the formation of molded sheets:

| | Parts |
|---|---|
| Polyvinyl alcohol (completely saponified) | 50 |
| Water | 20 |
| Glycerol | 15 |
| Ethanol formamide (stabilized) | 20 |

The molded product showed improved retention of flexibility at elevated temperature over products of the same formula in which unstabilized ethanol formamide was used.

It is to be understood, however, that it is not necessary to remove free formic acid or other stabilizer, as was done above, before using the treated ethanol formamide as a plasticizer. It may be so used immediately after the addition of the stabilizer or the stabilizer may be added to the composition with the other ingredients.

The foregoing specific description is to be construed as merely illustrative of the invention, which is defined in the claims.

What is claimed is:

1. A molding composition comprising polyvinyl alcohol, ethanol formamide, and formic acid.

2. A molding composition comprising polyvinyl alcohol, ethanol formamide, and acetic acid.

3. A molding composition comprising polyvinyl alcohol, ethanol formamide, and glycol diformate.

4. A polyvinyl alcohol composition containing as a plasticizer ethanol formamide stabilized by the addition of a substance selected from the group consisting of formic acid, acetic acid and the formic and acetic acid esters of glycerol and glycol.

5. A composition for use in forming shaped articles by means of heat and pressure comprising polyvinyl alcohol, ethanol formamide and a stabilizer for the ethanol formamide consisting of a substance selected from the group consisting of formic acid, acetic acid and the formic and acetic acid esters of glycerol and glycol.

6. A composition for use in making shaped articles by heat and pressure comprising polyvinyl alcohol, ethanol formamide and a formic acid ester of glycol.

CHARLES ARTHUR PORTER.
REUBEN FERSHKO.

REFERENCES CITED

The following references are of record in the file of this patent:

UNITED STATES PATENTS

| Number | Name | Date |
|---|---|---|
| 1,967,388 | Ziegler | July 24, 1934 |
| 2,250,664 | Watkins | July 29, 1941 |